United States Patent [19]
Segal et al.

[11] Patent Number: 6,049,783
[45] Date of Patent: Apr. 11, 2000

[54] INTERACTIVE INTERNET ANALYSIS METHOD

[75] Inventors: Gilbert Allan Segal, Hockessin; Ernest Hugo Zerenner, Wilmington, both of Del.

[73] Assignee: Power Financial Group, Inc., Hockessen, Del.

[21] Appl. No.: 09/086,738

[22] Filed: May 29, 1998

Related U.S. Application Data

[60] Provisional application No. 60/055,403, Aug. 8, 1997.

[51] Int. Cl.[7] .................................................. G06F 17/60
[52] U.S. Cl. ............................................. 705/37; 705/40
[58] Field of Search ........................ 705/37, 40; 235/380; 709/201

[56] References Cited

U.S. PATENT DOCUMENTS

| | | | |
|---|---|---|---|
| 4,334,270 | 6/1982 | Towers | 364/300 |
| 4,674,044 | 6/1987 | Kalmus et al. | 364/408 |
| 4,823,265 | 4/1989 | Nelson | 364/408 |
| 5,260,999 | 11/1993 | Wyman | 384/4 |
| 5,262,942 | 11/1993 | Earle | 364/408 |
| 5,270,922 | 12/1993 | Higgins | 364/408 |
| 5,297,031 | 3/1994 | Gutterman et al. | 364/408 |
| 5,347,452 | 9/1994 | Bay | 364/408 |
| 5,537,618 | 7/1996 | Boulton et al. | 395/161 |
| 5,544,281 | 8/1996 | Maruoka et al. | 395/68 |
| 5,630,123 | 5/1997 | Hogge | 395/607 |
| 5,754,939 | 5/1998 | Herz et al. | 455/4.2 |
| 5,761,661 | 6/1998 | Coussens et al. | 707/9 |
| 5,809,483 | 9/1998 | Broka et al. | 705/37 |
| 5,862,325 | 1/1999 | Reed et al. | 395/200.31 |
| 5,864,871 | 1/1999 | Kitain et al. | 707/104 |
| 5,893,079 | 4/1999 | Cwenar | 705/36 |
| 5,911,136 | 6/1999 | Atkins | 705/36 |
| 5,913,202 | 6/1999 | Motoyama | 705/35 |

*Primary Examiner*—Allen R. MacDonald
*Assistant Examiner*—Forest O Thompson, Jr.
*Attorney, Agent, or Firm*—James K. Luchs

[57] ABSTRACT

A client establishes and/or modifies an interactive account on a server via proprietary sorting and filtering and reporting criteria as a means for timely processing of online financial data and/or other business information to retrieve valuations, sorted lists, etc. The method involves establishing a link with a server preset and programmable with client criteria for investment or decision making, acquiring data, sorting, filtering, etc.

20 Claims, 2 Drawing Sheets

6,049,783

INTERACTIVE INTERNET ANALYSIS METHOD

This application is based on provisional application Ser. No. 60/055,403 filed on Aug. 8, 1997 under small entity status.

FIELD OF THE INVENTION

The invention relates to a method for making investment choices. In particular the invention relates to a method of filtering and sorting online financial data within a server to meet user criteria and format.

BACKGROUND OF THE INVENTION

U.S. Pat. No. 4,823,265 disclosed a means for automated renewal of options until a designated event occurs. U.S. Pat. No. 4,334,270 disclosed a method for using a digital computer to update securities information of multiple accounts. U.S. Pat. Nos. 4,674,044; 5,297,031; 5,347,452 deal with computer methods and visual displays for stock market brokers. From U.S. Pat. Nos. 4,209,845; 4,611,280; 5,218,700; 5,260,999 and 5,630,123 it was known to use software filtering and sorting to produce lists and locate specific data records. U.S. Pat. Nos. 5,262,942 and 5,270,922 provide data processing systems to serve the special needs of major investment firms.

Yet in spite of the technological advances made to meet the needs of stock brokers and investment firms, the prior art contained no suggestion of how the individual investor's needs could be met with regard to processing financial data according to individualized criteria. For the individual investor the task of matching individual criteria, once the data was retrieved or accessed in the published media, could require many hours, where over 2,700 stocks and over 40,000 options were involved.

SUMMARY OF THE INVENTION

It is the object of the invention to provide an interactive method via an Internet server for timely processing of data to meet the criteria of individual clients. This criteria can be easily changed to allow these clients the ability to request many variations of the data based on their individual needs. It is a further objective to provide quality results with improved speed of referral compared to existing business and financial systems.

The method of the invention includes the steps:
establishing a data filtering and sorting system for accounts within a server;
configuring the server to allow a client to interact with a database on the server;
setting and modifying upon request filtering and sorting and reporting criteria; and
providing timely access to online data as a means for filtering and sorting and reporting.

DETAILED DESCRIPTION OF THE INVENTION

The problem with existing software dealing with stocks, stock options, futures, etc. was that it was devoted to meeting the needs of brokers and other professionals. Prior to the present invention there was no means available whereby the individual investor could make use of the speed of the computer in the same way as the investment professionals. Investment data is presented to individuals in a read only format with the content being very generic in nature. This invention gives these individual investors the ability to interact with a database in order to extract information, which is tailored to their individual needs. Individual criteria can be inputted and changed to explore different scenarios.

DETAILED DESCRIPTION OF THE DRAWINGS

Figure 1:
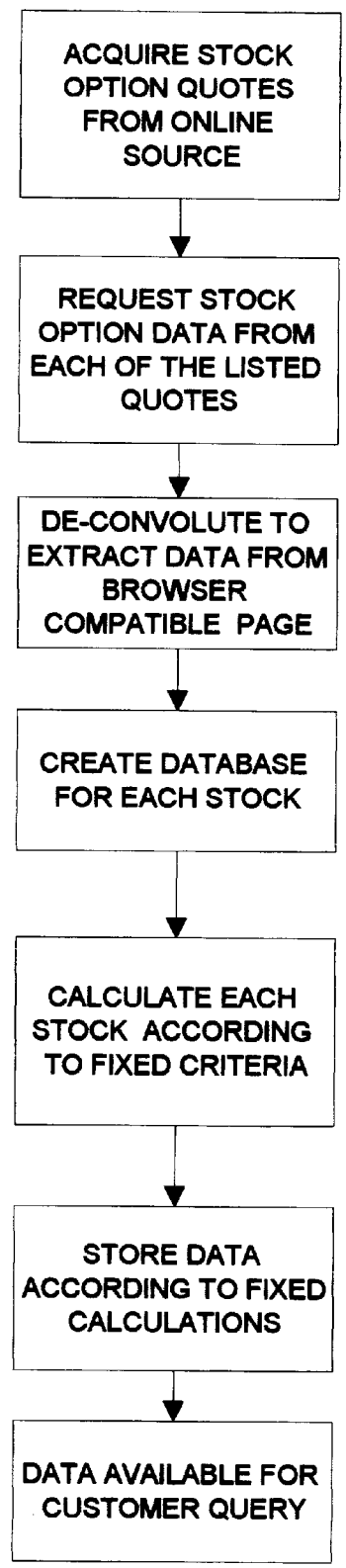
FIG. 1 The steps involved with acquiring the data and its storage on a server are illustrated in a flow diagram.

FIG. 1 Thousands of data items involving stocks and stock options are acquired from the Internet or other data source. These data items are sequentially processed to extract information of interest and further processed into a database one item at a time. Using stored fixed criteria and algorithms the database is created by calculation and made available for client query.

Figure 2:
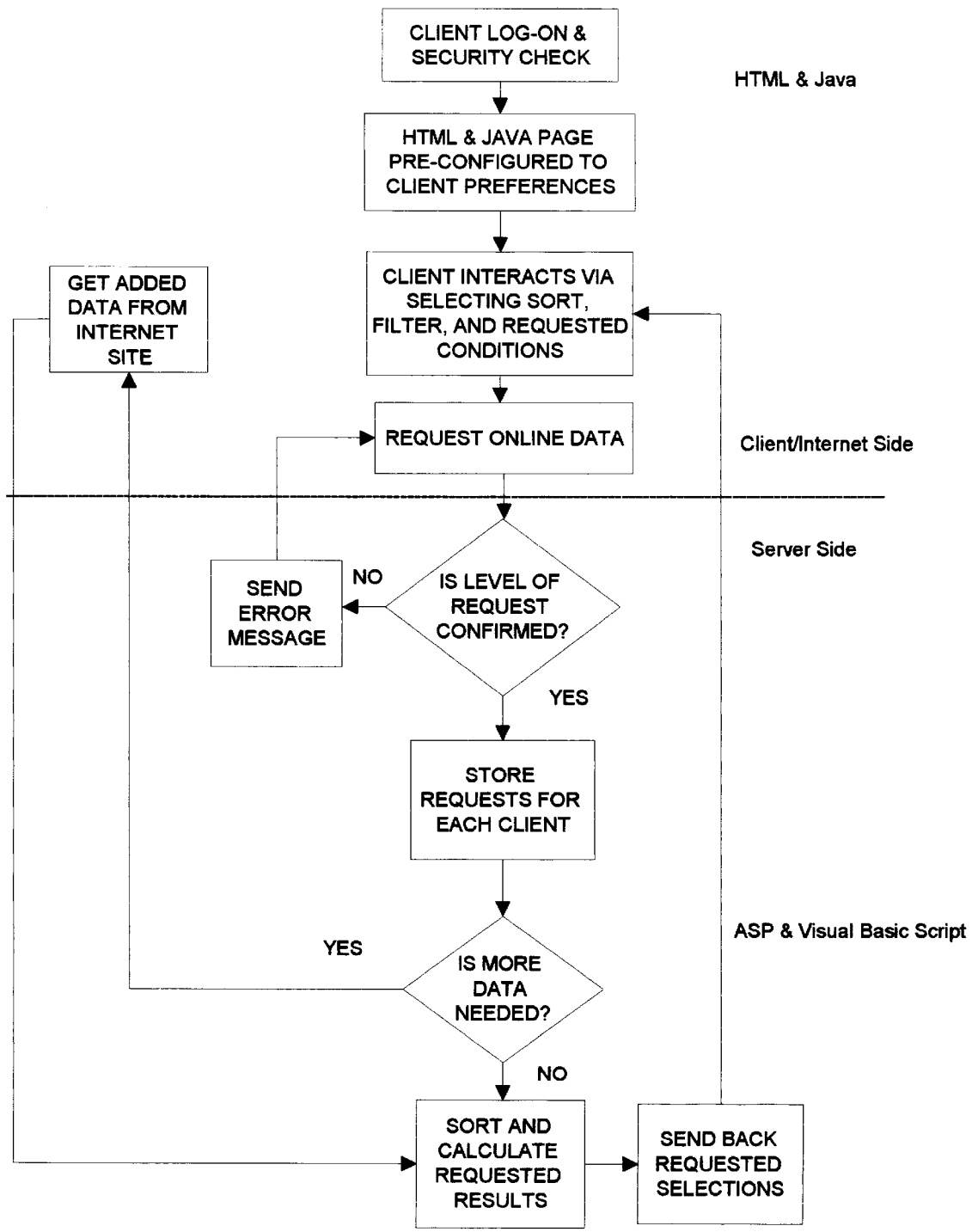
FIG. 2 The steps involved with a multi-task account on a server, which can be queried by the individual investor, are illustrated in a flow diagram.

FIG. 2 In the drawing all functions below the dotted line take place within a server, whereas the functions above the line require interaction of the client to configure and/or reconfigure processing within the server. Sequentially the client logs on and after a security check has the option to use preconfigured parameters or can modify filtering and sorting parameters. Within the server the request for data is checked to confirm subscription level according to the subscriber price paid for by the client. If the level does not exceed what has been paid for the request is stored, processed, assorted and calculated with provision for obtaining more Internet data if required. The requested selections are finally sent back to the client according to the criteria specified. Data acquisition and program languages are not limited to the ones illustrated in FIG. 2.

The following definitions pertain to the Figures and Preparations and Examples which serve to illustrate the practice of the invention without being limiting.

Browser A Client side program that retrieves World Wide Web pages and displays them to the user.

HTML HyperText Markup Language—This is the standard language used by Internet Browsers for describing the contents and structure of pages on the World Wide Web.

JAVA A general-purpose programming language developed by Sun Microsystems Inc.

ASP Active Server Page—Server side language developed by Microsoft Inc. for NT servers.

NT A computer operating system developed by Microsoft Inc.

VB Script Visual Basic Script—An interpretive language developed by Microsoft Inc.

Server A Computer that offers services on a network. On the World Wide Web, the server is the computer that runs the Web server program.

De-convolute Extraction of data to present it in a different format.

Level The difference in subscriber capability is based on the price of the subscription. Black-Scholes A mathematical formula used to calculate an option's theoretical value from the following inputs: stock price, strike price, interest rates, dividends, time to expiration, and volatility.

Preparation A

A software program for a server to use fixed and variable user criteria for a security account was coded wherein analysis of stock option data produces valuations and sorted lists from over two thousand stocks listed on one or more exchanges. The data is downloaded from the Internet or other source either at the close or after a transaction. FIG. 1 provides a flow sheet for the first interactive server system to be evaluated and commercialized with both US and International Internet Clients.

Preparation B

A software program for a server capable of multi-function financial analysis for stocks, stock options, bonds, commodities, etc. was coded to provide for individual accounts to be established and maintained or modified and updated by means of investor criteria to set parameters for sorting, filtering, data selection, reports, etc. FIG. 2 provides a flow sheet for modifications and improvements to Preparation A resulting from requests of clients who required alternatives other than those pre-programmed.

EXAMPLE 1

A one month trial program with over 200 users was used to evaluate Preparation A for operational flaws and defects in coding. Following corrections and modifications a commercial system was established with each client paying a monthly fee of $29.95 US Dollars. One client was well pleased to obtain in just 15 minutes from a list of over 2,400 stocks, sorted options information, which previously took him more than 4 hours to calculate on a Saturday afternoon.

Table 1 contains the data obtained from a sort performed by the method:

TABLE 1

| Stock name | symbol | opt. symbol | strike | bid | vol. | open int. | not called | called |
|---|---|---|---|---|---|---|---|---|
| Check Point | CHKPF | KEQBG | Feb 12.5 | 3¾ | 69 | 109 | 11.2% | 15.7% |
| Yurie Sys. | YURI | YQIBX | Feb 22.5 | 2¾ | 20 | 81 | 12.1% | 10.7% |
| Marine Drll | MDCO | QDMBW | Feb 17.5 | 1¹⁵⁄₁₆ | 417 | 604 | 11.0% | 10.7% |

Table 2 contains the investor selected sorts needed to obtain the sorted list of Table 1.

Table 2

Spread less than 5

Not called % greater than 11

Called % greater than 10

Volume greater than 10

Open interest greater than 10

Stock price greater than 10 and less than 100

Both in the money and out of the money calls

EXAMPLE 2

A server system as per Preparation B will allow both individual investors and financial professionals to customize a proprietary account to process financial data and business information not limited to stock options.

The main advantage attributed to the inventive method as illustrated in FIG. 2 has been that the individual investor has been free to experiment with investment scenarios rather than being forced to rely on the generic read only formats available from stock brokers and investment professionals who have invested in computer systems designed to give them maximum income for minimum services. Unless those individual investors had portfolios worth in excess of two million dollars, they were simply classified within one of the low profit categories. Then by entering this minimal information a broker or investment professional can deliver buy and sell investment choices, which will provide steady income regardless of developing better than average results.

What we claim is:

1. A method for processing data within a server, with the steps:
   (1) establishing a filtering and sorting system for a client within a separate account on an interactive server;
   (2) setting and modifying upon request filtering and sorting and reporting parameters for each account;
   (3) providing timely access to a source of data and/or data bases as a means for filtering and sorting data and retrieving valuations, or other client information, graph or report; and
   (4) maintaining access to data and data bases for all accounts up to the level of service paid in full at the time of a request for service.

2. The method of claim 1 where the server is configured to allow a client to interact with a database on the server.

3. The method of claim 2 used to test and examine different scenarios with a variety of data sources.

4. The method of claim 1 where financial data is processed to provide valuations and sorted lists.

5. The method of claim 4 where the client criteria are selected from one or more: open interest, percent if called, percent if not called, in the money, out of the money, option month, spread between called and not called, minimum and maximum search criteria, price of stock, volume of the stock or option, volatility, or Black-Scholes value.

6. The method of claim 5 where stock option data is filtered and sorted and stored.

7. The method of claim 6 where the data is processed from a browser compatible page.

8. The method of claim 1 where financial data is downloaded from an Internet source to the server after the close of the market or from other market sources during the market day.

9. The method of claim 8 used for valuations of one or more months or long term leap options.

10. A method for selecting stocks, bonds, and derivatives with the steps:
    (1) selecting criteria for sorting and filtering within an interactive server;
    (2) setting the selected criteria within the server to establish a proprietary account;
    (3) establishing an online link with the server;
    (4) accessing timely financial data;
    (5) processing the data via test criteria; and
    (6) retrieving processed data.

11. The method of claim 10 with access to data and data bases both within the server and on the Internet.

12. The method of claim 10 where the processed data is one or more of valuation, sorted list, graph or report.

13. The method of claim 10 where the financial data is stock options obtained during the market operation.

14. The method of claim 10 where the financial data is stock options obtained after the market close.

15. The method of claim 14 where selection criteria include at least one of open interest, percent if called, percent if not called, in the money, out of the money, option month, spread between called and not called, minimum and maximum search criteria, price of stock, volume of the stock or option, volatility, Black-Scholes value, price earnings ratio, earnings or earnings change, % volume change, number of shares or capitalization, range between the high and the low, or put options.

16. A financial data service method with the steps:
(1) supplying stock and stock option investment criteria for setting up or modifying a proprietary account on an interactive programmable server as a means for setting filtering and sorting and retrieving parameters for processing financial data,
(2) establishing an online link with the server;
(3) transferring financial data for processing;
(4) processing the financial data; and
(5) retrieving data in set format.

17. The method of claim 16 where an Internet source provides financial data obtained for stock and stock options after the close of trading for the day.

18. The method of claim 17 where the criteria for valuations and sorted lists for stock options are one or more of: open interest, percent if called, percent if not called, in the money, out of the money, option month, spread between called and not called, minimum and maximum search criteria, price of stock, volume of the stock or option, volatility, or Black-Scholes value, price earnings ratio, earnings or earnings change, % volume change, number of shares or capitalization, range between the high and the low, or put options.

19. The method of claim 18 wherein stock option valuations and sorted lists are retrieved within 15 minutes of transferring the financial data.

20. The method of claim 16 wherein an individual investor interacts with a database on the server to test and examine different scenarios.

* * * * *

UNITED STATES PATENT AND TRADEMARK OFFICE
CERTIFICATE OF CORRECTION

PATENT NO. : 6,049,783
DATED : April 11, 2000
INVENTOR(S) : Gilbert Allan Segal et al.

It is certified that error appears in the above-identified patent and that said Letters Patent is hereby corrected as shown below:

Column 1,
Line 49, "referral" should be -- retrieval --.

Column 2
Line 58, "Black-Scholes" should start a new line.

Signed and Sealed this

Thirty-first Day of July, 2001

Attest:

*Attesting Officer*

NICHOLAS P. GODICI
*Acting Director of the United States Patent and Trademark Office*